(12) United States Patent
Janin et al.

(10) Patent No.: US 6,961,866 B2
(45) Date of Patent: Nov. 1, 2005

(54) WATCHDOG TIMER FOR MICROCONTROLLER

(75) Inventors: Pascal Janin, Tullins (FR); Michael Giovannini, Grenoble (FR); Corinne Ianigro, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 10/670,996

(22) Filed: Sep. 24, 2003

(65) Prior Publication Data

US 2005/0114732 A1 May 26, 2005

(30) Foreign Application Priority Data

Sep. 24, 2002 (FR) .......................................... 02 11786

(51) Int. Cl.[7] .............................................. G06F 11/00
(52) U.S. Cl. ............................................ 714/3; 714/55
(58) Field of Search ............................... 714/3, 25, 30, 714/31, 39, 47, 55, 56, 48, 51, 57

(56) References Cited

U.S. PATENT DOCUMENTS

| | | | | |
|---|---|---|---|---|
| 4,705,970 A | | 11/1987 | Turnpaugh | 307/600 |
| 5,175,845 A | * | 12/1992 | Little | 713/323 |
| 5,203,000 A | * | 4/1993 | Folkes et al. | 713/340 |
| 5,418,968 A | * | 5/1995 | Gobeli | 710/260 |
| 5,694,336 A | | 12/1997 | Hirao | 364/551.01 |
| 5,864,663 A | * | 1/1999 | Stolan | 714/55 |
| 5,907,863 A | * | 5/1999 | Bolyn | 711/167 |

FOREIGN PATENT DOCUMENTS

EP 0315054 5/1989 ........... G06F/11/00

* cited by examiner

*Primary Examiner*—Nadeem Iqbal
(74) *Attorney, Agent, or Firm*—Lisa K. Jorgenson; Allen, Dyer, Doppelt, Milbrath & Gilchrist, P.A.

(57) ABSTRACT

A method for operating a watchdog timer associated with a microcontroller that generates refresh commands for the watchdog timer is provided. The refresh commands are separated by a time interval within a predetermined range. The method includes receiving the refresh commands by the watchdog timer, and generating a microcontroller reset command by the watchdog timer when a time interval separating successively received refresh commands is not within the predetermined range. In particular, the generating includes staring a refresh countdown on each receipt of a refresh command by the watchdog timer. A reset countdown is started if the refresh countdown has timed out, and if the refresh countdown has not timed out when a next refresh command is received, then the next refresh command does not restart the reset countdown. The microcontroller reset command is generated if the reset countdown has timed out.

32 Claims, 3 Drawing Sheets

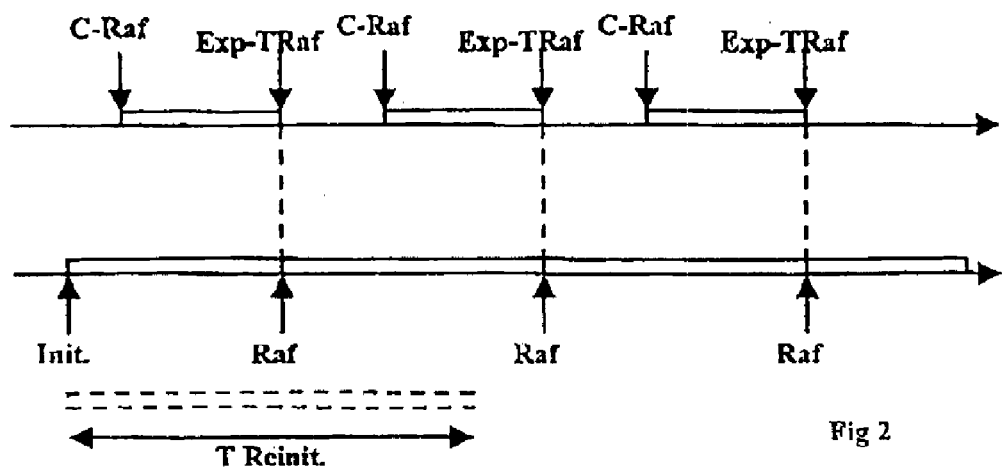
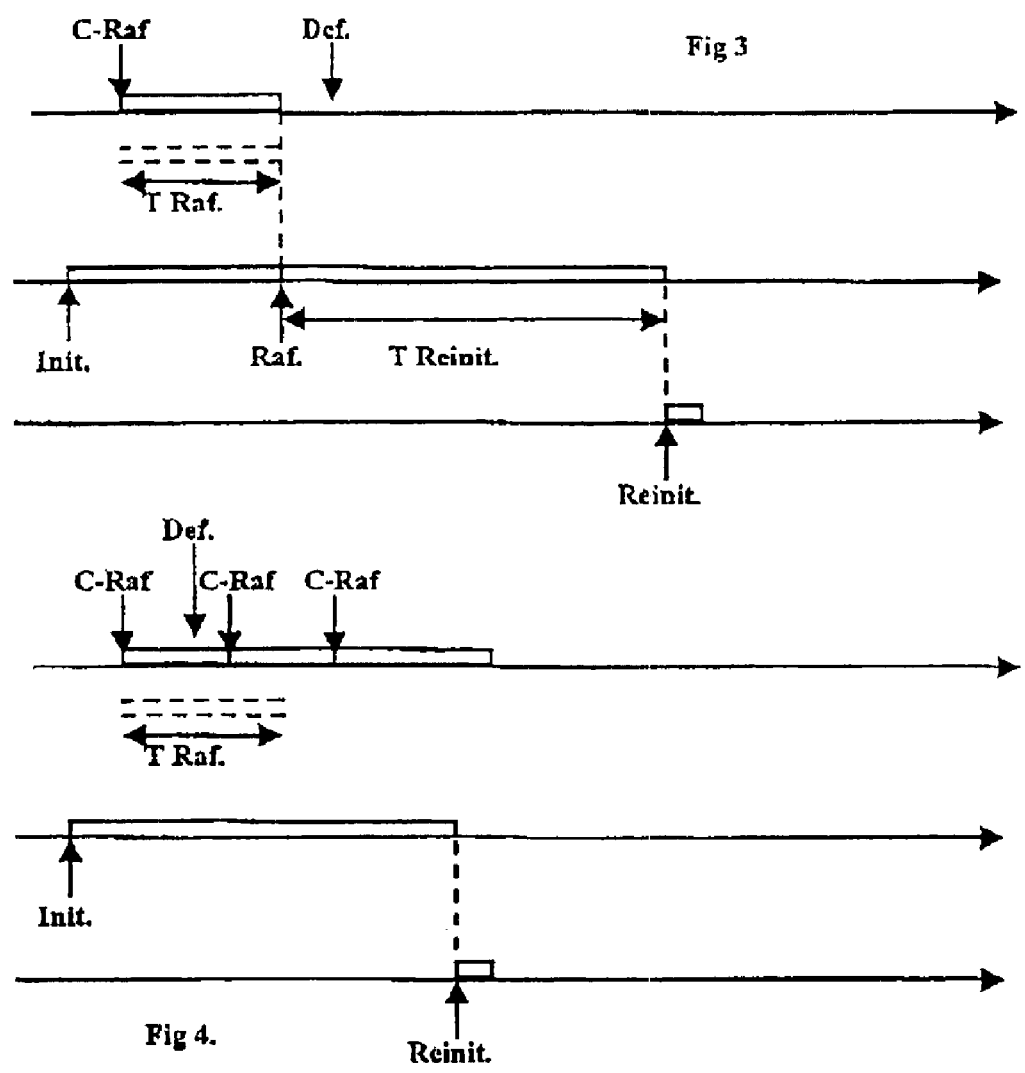

WATCHDOG TIMER FOR MICROCONTROLLER

FIELD OF THE INVENTION

The present invention relates to monitoring timers, and in particular, to monitoring timers associated with microcontrollers. These monitoring timers are also called watchdog timers.

BACKGROUND OF THE INVENTION

Microcontrollers associated with watchdog timers are known in the prior art. External interference or unexpected logic conditions can sometimes cause failure of an application or software used by the microcontroller. The closer controllers are located to strong magnetic and electrical fields, the more they are subject to such failures. The application or the software then fails to operate in accordance with its normal logic sequence.

Watchdog timers conventionally have a register with several bits which store a remaining time period before a reset. The bits are decremented at regular intervals by a timer, in the form of a countdown. When the microcontroller operates normally, the micro-controller writes a non-zero time period at regular intervals in the register. In most cases of abnormal microcontroller operation, the application or software runs in a loop and no longer writes any new time value in the register of the watchdog timer. The countdown therefore continues until it times out.

On timeout, the watchdog timer resets the microcontroller. For this purpose, one of the register bits is logically connected to a microcontroller reset pin. When this bit reaches a low status, i.e., on expiration of the time limit, the microcontroller is reset. The application or software used on the microcontroller can then be restarted under good conditions. A logic circuit can also be inserted between the register bit intended for resetting and the reset pin of the microcontroller. The logic circuit can be an ET or NON-ET type and have a second input connected to a logic activation input. The functioning of the watchdog timer can therefore be activated or disabled selectively via this circuit.

This type of watchdog timer has disadvantages. The software or application of the microcontroller may unduly write new time periods at reduced time intervals in the register of the watchdog timer. This may be the case, in particular, if the application or software of the microcontroller runs in an endless loop on a write routine in the register of the watchdog timer. Therefore, even in the event of failure of the application or program, the register does not undergo countdown to timeout and the application or software is therefore not reset.

Also, U.S. Pat. No. 4,705,970 describes a watchdog timer for a microprocessor. The timer has two counters. The counters are respectively associated with a minimum time period and a maximum time period separating two successive timer refresh commands. These two counters are fully independent. This timer has the disadvantage of two close refresh commands causing resetting of the microprocessor, whereas they do not necessarily correspond to a software loop.

SUMMARY OF THE INVENTION

In view of the foregoing background, an object of the present invention is to provide a microcontroller watchdog timer that addresses the above stated disadvantages.

This and other objects, advantages and feature in accordance with the present invention are provided by a microcontroller watchdog timer comprising a reset counter having a refresh input and a reset output. The microcontroller watchdog timer starts a reset countdown on receipt of a refresh command on its refresh input, and applies a reset command to the reset output on expiration of the reset countdown.

The microcontroller watchdog timer in accordance with the present invention, which conforms to the generic definition given in the background section, is essentially characterized in that it applies a method for optimizing its functioning, as described below.

According to a first embodiment, the watchdog timer comprises a reset counter comprising a refresh input and a reset output. The watchdog timer starts a reset countdown on receipt of a refresh command on its refresh input, and applies a reset command to the reset output on timeout of the reset countdown. A refresh counter is connected to the refresh input of the reset counter, and has a refresh input and starts a refresh countdown on receipt of a refresh command on its refresh input. A refresh command is only applied to the refresh input of the reset counter on timeout of the refresh countdown time.

According to a second embodiment, the watchdog timer comprises a reset counter having a refresh input and a reset output, and starts a reset countdown on receipt of a refresh command on its refresh input, and applies a reset command to the reset output on timeout of the reset countdown. A refresh counter is connected to the refresh input of the reset counter, and has a refresh input, and starts a refresh countdown on receipt of a refresh command on its refresh input. A refresh command is only applied to the refresh input of the reset counter if the refresh countdown has expired at the time of receipt of the refresh command.

The reset counter may comprise a register. The register may comprise a plurality of bits including a high-order bit connected to the reset output.

The watchdog timer may also comprise an activation input. A logic circuit having a first input may be connected to the activation input, and a second input of the logic circuit may be connected to the reset output of the reset counter. The register may also include an activation bit connected to the activation input.

Provision may also be made for the watchdog timer to have a timer input, and a frequency divider. The frequency divider may have an input connected to the timer input, and an output may be connected to the bits of the reset counter for decrementing the reset counter when a signal is applied thereto by the frequency divider.

The duration of the refresh countdown may be shorter than the time separating two decrements of the reset counter. The refresh counter may comprise a plurality of bits and may also be connected to the timer input. The refresh counter is decremented when a clock signal is applied thereto. The duration of the reset countdown may be programmable.

The invention also concerns a method for optimizing the functioning of a microcontroller watchdog timer having normal time periods separating refresh commands of the watchdog timer lying within a range having a minimum time period and a maximum time period. The method comprises receiving refresh commands by the watchdog timer, and generating a reset command for the microcontroller by the watchdog timer when the time interval separating successively received refresh commands is not within the range.

Generating the reset command may comprise launching or starting a reset countdown and generating the reset command on expiration of the reset countdown. The refresh countdown is restarted for each refresh command received. If a refresh command is received while the refresh countdown has not timed out, a refresh command does not restart the reset countdown.

The method may comprise starting a reset countdown, on receipt of a refresh command by the watchdog timer, and start of the refresh countdown. The method may further comprise restarting of the reset countdown on expiration of the refresh countdown, and generating a reset command on expiration of the reset countdown. The duration of the reset countdown is equal to the maximum time period of the range, with the duration of the refresh countdown being equal to the minimum time period of the range.

On receipt of a refresh command by the watchdog timer, if the refresh countdown has timed out, the reset countdown is started, and if the refresh countdown has not timed out, then the reset countdown continues and the refresh countdown is restarted.

A reset command may be generated on expiration of the reset countdown. The duration of the reset countdown may be equal to the maximum time period of the range, with the duration of the refresh countdown being equal to the minimum time period of the range.

If the refresh countdown has timed out, the start of the reset countdown and the start of the refresh countdown may be simultaneous on receipt of a refresh command. The reset countdown may be synchronized on a frequency-divided clock signal. Likewise, the refresh countdown may be synchronized on a clock signal.

The method may also comprise a programming step for programming the duration of the reset countdown. The refresh command received by the refresh input of the refresh counter may define the duration of the reset countdown.

The refresh command may comprise a word made up of a plurality of bits written in the reset counter during a starting step for defining the duration of the reset countdown. The reset counter may comprise a counter including a plurality of bits, and the reset command may be generated by transition of the high-order bit of the reset counter to a low level.

BRIEF DESCRIPTION OF THE DRAWINGS

The invention will be better understood on reading the following description and examining the accompanying figures.

FIGS. 2 to 4 are timing diagrams illustrating the functioning of a first example of a watchdog timer for different cases of microcontroller operation.

DETAILED DESCRIPTION OF THE PREFERRED EMBODIMENTS

The invention therefore puts forward a watchdog timer generating a reset signal for a microcontroller when the time interval separating successive refresh commands is shorter than a minimum time period for normal operation. The invention particularly concerns a watchdog timer in which a refresh counter locks refresh commands intended to restart a reset counter of the microcontroller. The refresh commands are given by the microcontroller and their transmission to the reset counter is locked during the countdown of the refresh counter. The refresh commands, received by the refresh counter before its time is out, reset this counter. Therefore, if the microcontroller sends refresh commands in a loop, the countdown of the reset counter is not restarted and can reset the microcontroller when it expires. A refresh loop of the microcontroller therefore does not inhibit resetting of the microcontroller.

The invention can be applied in particular using two embodiments described below. According to a first embodiment, the refresh commands are inhibited during the refresh counter countdown and are only transmitted to the reset counter when it expires. According to a second embodiment that is even more advantageous, the refresh commands are not transmitted when they arrive during the refresh countdown. In both embodiments, the received refresh commands restart the countdown of the refresh counter.

Figure 1:
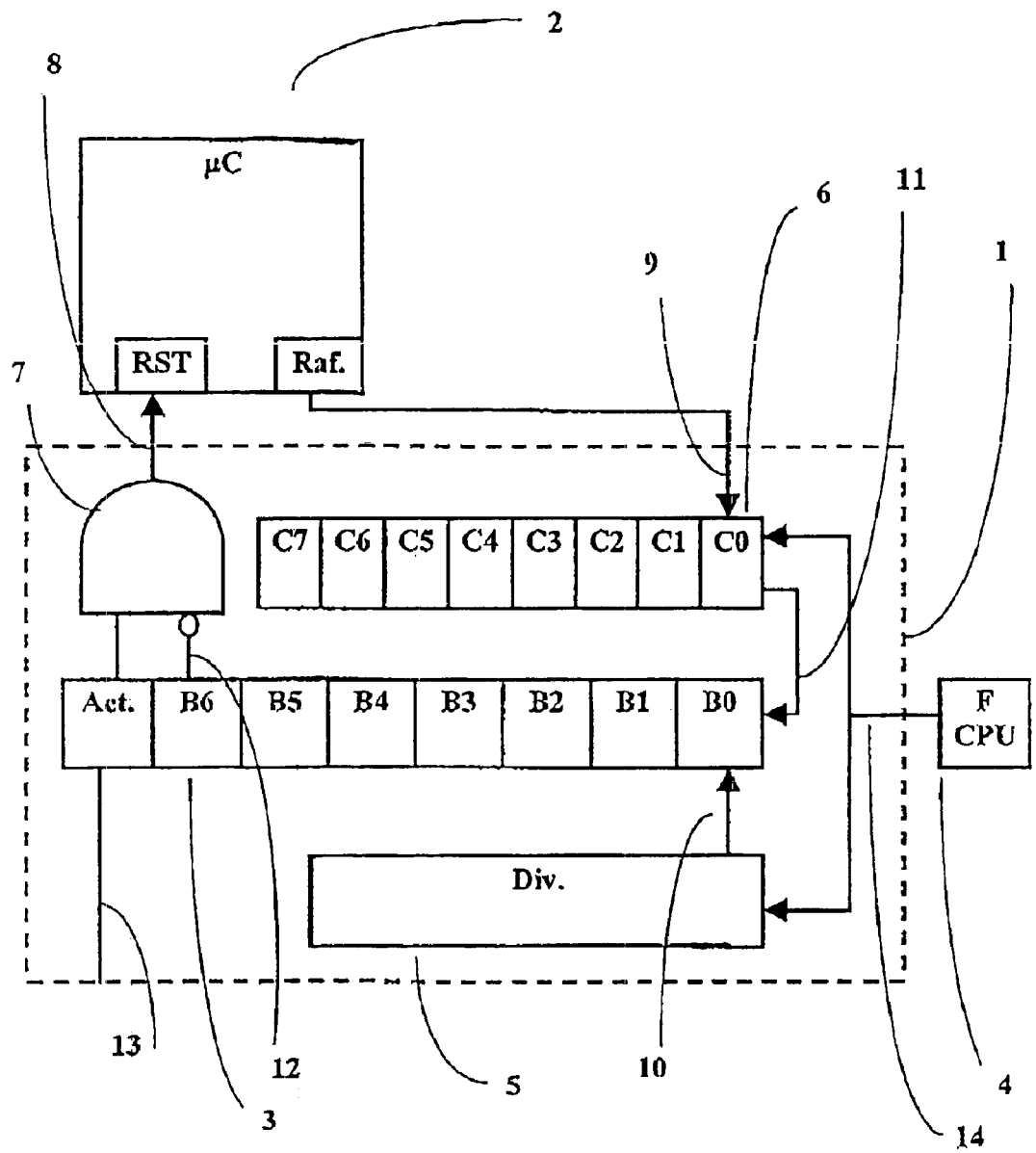
FIG. 1 is a schematic illustration of a watchdog timer according to the present invention associated with a microcontroller.

FIG. 1 is a schematic illustration of the structure of a watchdog timer 1 according to the invention, and an associated microcontroller 2. The refresh clock is delimited in FIG. 1 by the dashed line. The watchdog timer 1 has a reset command output pin 8 connected to a reset pin RST on the microcontroller 2. This pin 8 is therefore designed to apply, in a known manner, a reset signal to an appropriate pin of the microcontroller 2. The watchdog timer 1 also has a refresh command input pin 9 on which a pin Raf of the microcontroller 2 can apply a refresh command.

The watchdog timer 1 also has a reset counter 3 as readily understood by those skilled in the art. This counter 3 has a reset command output 12 having a logical link with the reset command output pin 8. The reset command output 12 can therefore either directly apply the reset signal to pin 8, or be connected to pin 8 via a logic port as will be detailed below. The reset counter 3 also has a refresh command input 11.

The reset counter 3 is designed to apply a reset command to the reset output 12 on expiration of its countdown. The reset counter 3 is also designed to start a new countdown when a refresh command is applied to the refresh command input 11.

A refresh counter 6 is connected between the refresh command input terminal 9 and the refresh command input 11. The refresh counter 6 is designed to launch or start a new refresh countdown, i.e., its own countdown, on receipt of a refresh command on the refresh command input terminal 9.

According to the first embodiment, this refresh command is only transmitted to the refresh command input 11 of the reset counter 3 if no refresh command is received before the timeout of the refresh countdown.

According to the second embodiment, such a refresh command is not transmitted to the refresh command input 11 of the reset counter 3 if it is received during the countdown of the refresh counter 6.

Therefore, assuming that the microcontroller 2 runs an endless loop sending close refresh commands, the reset countdown 3 is nonetheless not restarted. The reset counter 3 then continues its countdown while the refresh counter 6 is restarted on each refresh command, i.e., indefinitely since the microcontroller 2 sends these commands in a loop. When the reset counter 3 reaches timeout, it emits a reset command to the microcontroller 2 to reset the application or software which has gone into a loop.

The watchdog timer 1 is therefore designed only to leave the microcontroller 2 operating continuously if the microcontroller generates refresh command signals separated by normal time intervals lying within a given range.

FIGS. 2 to 4 show timing diagrams of the functioning of the watchdog timer, according to the first embodiment. FIG. 2 is a timing diagram of a normal operation. The maximum desired interval separating refresh commands is equal to the duration of the reset countdown. If no refresh command is given during this time interval, the countdown of the reset counter times out as illustrated in FIG. 3. The duration of the refresh countdown is also equal to the minimum time period of the range as illustrated in FIG. 4.

FIG. 2 illustrates the furnishing of the watchdog timer 1 during normal operation of the microcontroller 2. The microcontroller 2 is able to send refresh commands spaced out by a time interval lying within the desired range. The first timing diagram shows the status of the refresh counter 6 while the second timing diagram shows the status of the reset counter 3. The countdown of the reset counter 3 is started at time Init. The countdown of the refresh counter 6 is started when it receives a refresh command C-Raf. On expiration (time denoted Exp-TRaf or Raf) of a TRaf time interval, the countdown of the reset counter 3 has not timed out, and this countdown is restarted. The reset counter 3 therefore does not generate a reset command. Consequently, a maximum time period is defined separating refresh commands, sent by the microcontroller 2, by fixing the duration of the reset countdown.

FIG. 3 illustrates the functioning of the watchdog timer 1 during a microcontroller loop which does not generate a refresh command. The microcontroller 2 operates correctly up until time Def. It then no longer sends out a refresh command. The reset countdown subsequently continues its countdown until it times out. The watchdog timer 1 then generates, in a known manner, a reset command at time Reinit, as shown in the third timing diagram of FIG. 3. The refresh counter 6 therefore has no influence on the generation of a reset command in this particular case.

FIG. 4 shows the functioning of the watchdog timer 1 during a microcontroller loop generating close refresh commands initiated at time Def. When the time interval separating successive refresh commands of the microcontroller 2 is shorter than the duration of the refresh countdown TRaf, the refresh countdown is restarted at each new refresh command. The countdown of the reset counter 3 is then not restarted. When this counter times out at time Reinit, the watchdog timer 1 generates a reset command, as shown in the third timing diagram of FIG. 4. The duration of the refresh countdown TRaf therefore defines the minimum time period which must separate refresh commands given in repeated succession.

The watchdog timer 1 using this first embodiment advantageously comprises a memory component for the last refresh command received on input 9 so that if necessary it can transmit the same to the reset counter 3 on timeout of the refresh countdown.

Figure 5:
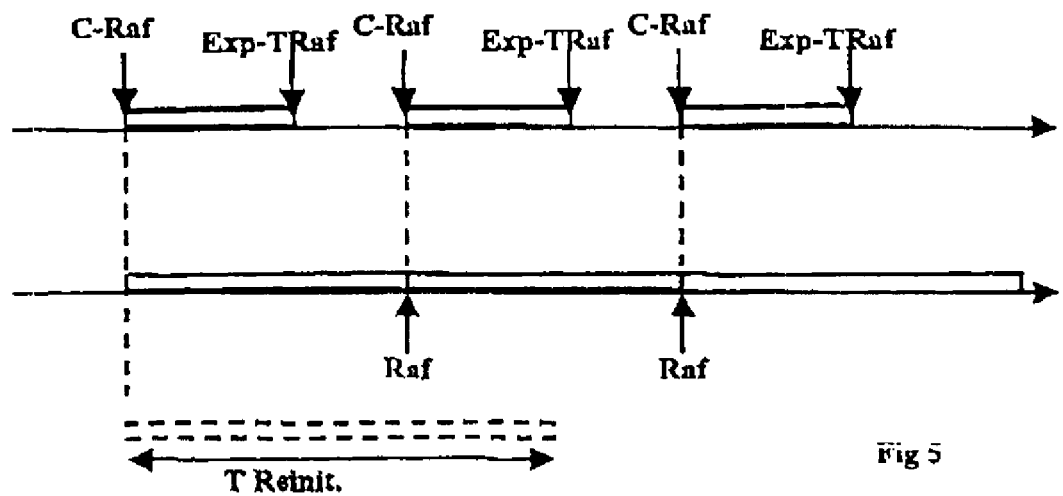
FIGS. 5 to 7 are timing diagrams illustrating the functioning of a second example of a watchdog timer for different cases of microcontroller operation.
Figure 6:
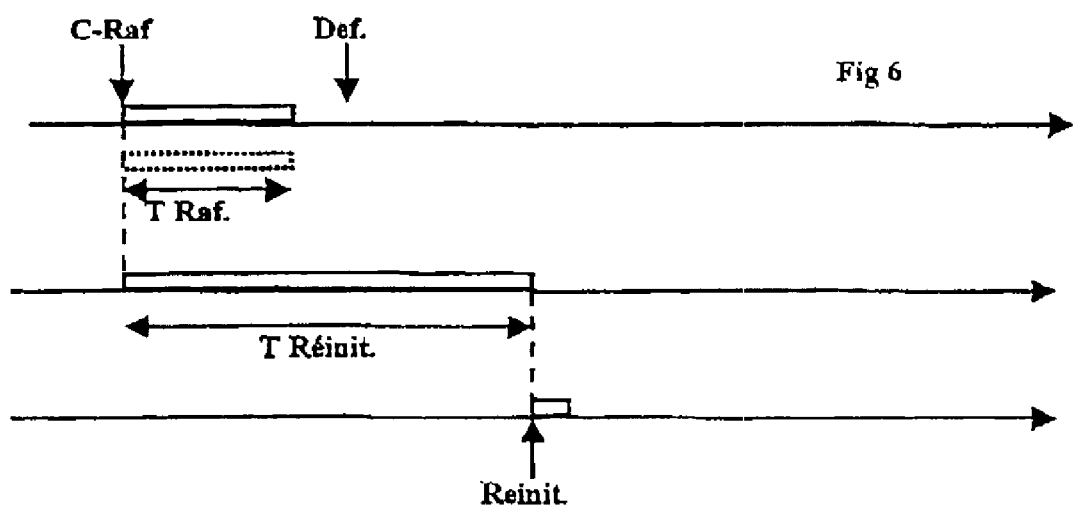
Figure 7:
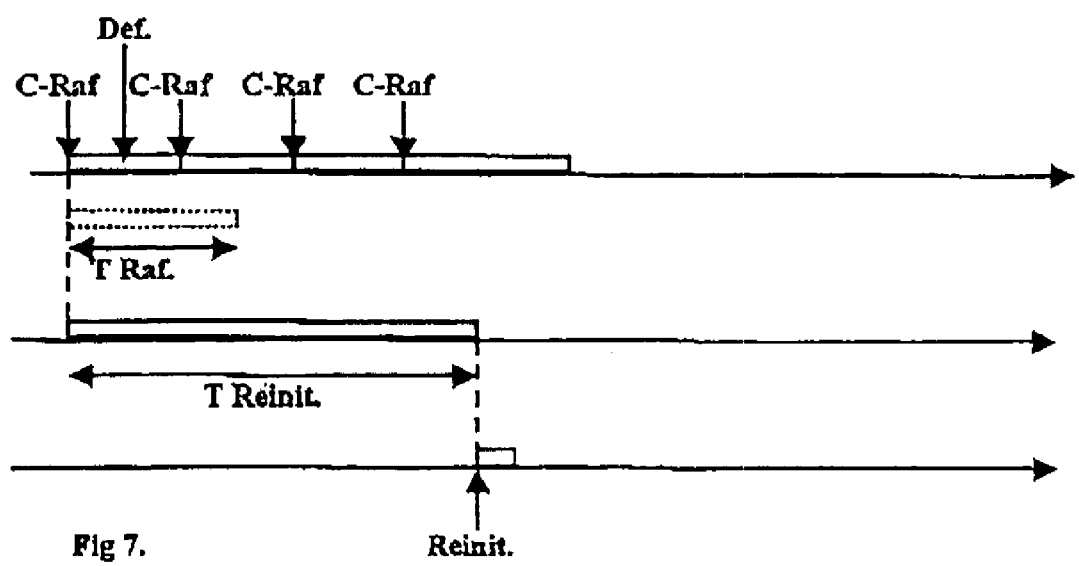

FIGS. 5 to 7 are timing diagrams of watchdog timer operations according to the second embodiment. FIG. 5 is a timing diagram of normal operation. The maximum desired period separating refresh commands is also equal to the duration of the reset countdown. If no refresh command is given during this period, the countdown of the reset counter 3 times out as illustrated in FIG. 6. The duration of the refresh countdown is also equal to the minimum time period of this range, as illustrated in FIG. 7.

FIG. 5 therefore illustrates the functioning of the watchdog timer 1 according to the second embodiment during normal operation of the microcontroller 2. The microcontroller 2 is able to send refresh commands spaced out by a time interval lying within the desired range. The countdown of the refresh counter 6 is started at the time corresponding to receipt of an initial refresh command C-Raf. At this time, the countdown of the refresh counter 6 is still in a timeout status. The refresh command is then transmitted to the reset counter 3. The countdown of the reset counter 3 is therefore initially restarted at the same time as the refresh countdown. The following refresh command is received after expiration of the countdown of the refresh counter 6. This command therefore also restarts the reset counter 3 at time Raf, before the timeout of the reset countdown then in progress. The reset counter 3 therefore does not generate a reset command. As in the previous embodiment, a maximum time period is defined separating refresh commands, sent by the microcontroller 2, by setting the duration of the reset countdown.

FIG. 6 illustrates the functioning of the watchdog timer 1 during a microcontroller loop which does not generate a refresh command. The refresh counter 6 and the reset counter 3 are started simultaneously on receipt of a command C-Raf. The microcontroller 2 operates correctly up until time Def, then no longer emits a refresh command. The reset counter 3 then continues its countdown until it times out. The watchdog timer 1 then, in a known manner, generates a reset command at time Reinit, as shown in the third timing diagram in FIG. 6. In this embodiment, the refresh counter 6 therefore does not have any influence either on the generation of a reset command for this type of loop.

FIG. 7 illustrates the functioning of the watchdog timer 1 during a microcontroller loop generating close refresh commands, initiated at time Def. Each C-Raf command restarts the countdown of the refresh counter 6 as described previously. Each subsequent C-Raf command is therefore received before the timeout of the refresh counter 6 countdown. These commands are therefore not transmitted to the reset counter 3. The countdown of the reset counter 3 is reset command is then generated as shown in the third timing diagram in FIG. 7. The duration of the refresh countdown Traf therefore defines the minimum time period which is to separate refresh commands given in repeated succession.

It may be provided that the restart of the reset countdown is made via a microcontroller write in the reset counter 3. In particular, provision may be made for this write to be inhibited during the refresh countdown. This second embodiment is advantageous since it does not require memorizing or time shifting a refresh command received on the input 9 and transmitting it to the reset counter 3.

In the variation shown in FIG. 1, the reset counter comprises several bits B0 to B6. The high-order bit B6 of the reset counter 3 is connected to the reset output 12. Therefore, switching of the high-order bit B6 corresponds to expiration of the countdown and generates a reset signal given to the microcontroller 2. In the example shown, the reset counter 3 has 64 possible values during the countdown, defined by values B0 to B5.

The counter may be designed, for example, so that transition to low status of bit B6, complemented at the input of a logic device 7, applies a reset signal lasting on the order of 500 nanoseconds to a reset pin of the microcontroller 2. The microcontroller 2 is adequately programmed so as to send refresh commands at time intervals such as defined previously.

Use of a logic device 7 makes it possible to couple the reset output 12 of the reset counter 3 with an activation input 13. With the activation input 13 it is therefore possible to selectively activate or disable the generation of reset commands on the output pin 8. In the example in FIG. 1, the activation input fixes the status of an Act bit in a register in which the reset counter 3 is also included.

The watchdog timer 1 may also have a timer input 14 connected to the input of a frequency divider 5. The output 10 of the frequency divider 5 is connected to the reset counter 3. The frequency-divided signal is then used to decrement the reset counter 3. The clock signal is for example provided by an external oscillator 4, common to several electronic circuits. Provision may also be made for integration of the oscillator 4 in the watchdog timer 1 or in the microcontroller 2. The integrated oscillator 4 is then independent from the operating uncertainties of a possible external oscillator.

Provision may also be made for use of a refresh counter 6 having several bits, connected to the timer input, to decrement the countdown on each received clock signal. The refresh counter 6 has a connection 11 with the reset counter 3. This connection 11 is provided to selectively transmit a refresh command to the reset counter 3 in the cases described previously.

The refresh command transmitted to the reset counter 3 can take on several forms within the scope of the invention. Provision may be made for this command to be in the form of a pulse which restarts the countdown of the reset counter 3, whose duration is preset in the watchdog timer 1. Provision may also be made for the reset counter 3 to be programmable and for the refresh command given by the microcontroller 2 to define the duration of its countdown. The refresh command may therefore set a status of bits B0 to B5 to define the duration of the reset countdown. In the example shown in FIG. 1, there are 64 different time period values to conduct reprogramming. In particular, provision may be made to use a reset counter 3 in the form of a register, in which the microcontroller 2 can only write on timeout of the refresh countdown or outside the time period of the refresh countdown.

The invention may in particular be applied using an external 8 MHz clock signal, a 1/50,000 frequency divider, a reset register with 7 programmable counting bits, and a refresh counter with 8 counting bits decremented directly by the external clock signal. The value initially recorded in the register may for example be programmed between FFh and C0h. In this case, the period of the reset countdown lies between 6.250 and 400 ms.

It is also preferably provided that the duration of the refresh countdown is less than the time period separating two decrements of the reset countdown. Provision may also be made in the method of the watchdog timer operation that this timer is disabled after it has generated a reset command. The user can therefore choose whether the application programmed by the microcontroller 2 is to have recourse to the watchdog timer 1 or not. This possibility is made possible in particular by the arrangement comprising the activation input 13 described above. Provision may also be made so that the watchdog timer 1 can only be disabled after it has generated a reset command for the microcontroller 2, to avoid erroneous deactivation by the microcontroller. Therefore, monitoring of the microcontroller 2 cannot be accidentally interrupted.

Provision may also be made for the microcontroller 2 to control its own resetting by software. For example, it may be provided that the microcontroller 2 commands an adequate write entry in bit B6 of the register a to command its resetting. This possibility may be used in particular when the microcontroller 2 has itself detected a major error.

Although an independent watchdog timer 1 has been described above, the invention also applies to an integrated watchdog timer with other functions. For example, the watchdog timer 1 may be integrated in the microcontroller 2.

That which is claimed is:

1. A method for operating a watchdog timer associated with a microcontroller that generates refresh commands for the watchdog timer, the refresh commands being separated by a time interval within a predetermined range, the method comprising:

receiving the refresh commands by the watchdog timer; and generating a microcontroller reset command by the watchdog timer when a time interval separating successively received refresh commands is not within the predetermined range, the generating comprising starting a refresh countdown on each receipt of a refresh command by the watchdog timer, starting a reset countdown if the refresh countdown has timed out, and if the refresh countdown has not timed out when a next refresh command is received, then the reset countdown is not restarted, and generating the microcontroller reset command if the reset countdown has timed out.

2. A method according to claim 1, wherein the reset countdown is restarted only if the refresh countdown has timed out; and a duration of the reset countdown is equal to a maximum time period of the predetermined range, and a duration of the refresh countdown is equal to a minimum time period of the predetermined range.

3. A method according to claim 1, wherein the reset countdown is restarted only if the refresh countdown has timed out when the next refresh command is received; and a duration of the reset countdown is equal to the maximum time period of the predetermined range, and a duration of the refresh countdown is equal to the minimum time period of the predetermined range.

4. A method according to claim 3, wherein if the refresh countdown has timed out, then the reset countdown and the refresh countdown are restarted simultaneously on receipt of the next refresh command.

5. A method according to claim 1, wherein the reset countdown is synchronized with a frequency divided clock signal.

6. A method according to claim 1, wherein the refresh countdown is synchronized with a clock signal.

7. A method according to claim 1, further comprising programming duration of the reset countdown.

8. A method according to claim 7, wherein the watchdog timer comprises a refresh counter for performing the refresh countdown; and wherein the refresh command is received by the refresh counter for defining the duration of the reset countdown.

9. A method according to claim 8, wherein the watchdog timer comprises a reset counter for performing the reset countdown and is connected to the refresh counter; and wherein the refresh command comprises a word having a plurality of bits, the word being written in the reset counter for defining the duration of the reset countdown.

10. A method according to claim 1, wherein the watchdog timer comprises a reset counter for performing the reset countdown; and wherein the reset counter comprises a plurality of bits including a high-order bit, and the microcontroller reset command is generated by transition of the high-order bit to a low logic value.

11. A watchdog timer for a microcontroller that generates refresh commands for the watchdog timer, the refresh commands being separated by a time interval within a predetermined range, the watchdog timer comprising:

a refresh counter comprising a refresh input for receiving the refresh commands from the microcontroller, said refresh counter starting a refresh countdown on each receipt of a refresh command at the refresh input, and generating a refresh command on expiration of the refresh countdown; and a reset counter comprising a refresh input and a reset output, said reset counter starting a reset countdown on receipt of the refresh command generated by said refresh counter, and generating a microcontroller reset command at the reset output when the reset countdown times out.

12. A watchdog timer according to claim 11, wherein said refresh counter only generates a refresh command for restarting said reset counter when the refresh countdown has timed out; and a duration of the reset countdown is equal to a maximum time period of the predetermined range, and a duration of the refresh countdown is equal to a minimum time period of the predetermined range.

13. A watchdog timer according to claim 11, wherein said refresh counter only generates a refresh command for restarting said reset counter when the refresh countdown has timed out and a next refresh command is received by said refresh counter; and a duration of the reset countdown is equal to the maximum time period of the predetermined range, and a duration of the refresh countdown is equal to the minimum time period of the predetermined range.

14. A watchdog timer according to claim 11, wherein said reset counter comprises a plurality of bits including a high-order bit connected to the reset output.

15. A watchdog timer according to claim 14, wherein said reset counter comprises a register.

16. A watchdog timer according to claim 15, further comprising an activation input, and a logic circuit having a first input connected to the activation input and a second input connected to the reset output of said reset counter.

17. A watchdog timer according to claim 16, wherein said register comprises a register activation bit connected to the activation input.

18. A watchdog timer according to claim 11, further comprising:

a timer input; and a frequency divider having an input connected to the timer input, and an output connected to said reset counter for decrementing said reset counter when a signal is applied thereto by said frequency divider.

19. A watchdog timer according to claim 18, wherein duration of the refresh countdown is less than a time period separating two decrements of said reset counter.

20. A watchdog timer according to claim 18, wherein said refresh counter is connected to the timer input for receiving a clock signal, said refresh counter comprising a plurality of bits and being decremented when the clock signal is applied thereto.

21. A watchdog timer according to claim 11, wherein duration of the reset countdown is programmable.

22. An electronic circuit comprising:

a microcontroller generating refresh commands, the refresh commands being separated by a time interval within a predetermined range; and a watchdog timer connected to said microcontroller for receiving the refresh commands and comprising a refresh counter comprising a refresh input for receiving the refresh commands from the microcontroller, said refresh counter starting a refresh countdown on each receipt of a refresh command at the refresh input, and generating a refresh command on expiration of the refresh countdown, and a reset counter comprising a refresh input and a reset output, said reset counter starting a reset countdown on receipt of the refresh command generated by said refresh counter, and generating a microcontroller reset command at the reset output when the reset countdown times out.

23. An electronic circuit according to claim 22, wherein said refresh counter only generates a refresh command for resetting said reset counter when the refresh countdown has timed out; and a duration of the reset countdown is equal to a maximum time period of the predetermined range, and a duration of the refresh countdown is equal to a minimum time period of the predetermined range.

24. An electronic circuit according to claim 22, wherein said refresh counter only generates a refresh command for resetting said reset counter when the refresh countdown has timed out and a next refresh command is received by said refresh counter; and a duration of the reset countdown is equal to the maximum time period of the predetermined range, and a duration of the refresh countdown is equal to the minimum time period of the predetermined range.

25. An electronic circuit according to claim 22, wherein said reset counter comprises a plurality of bits including a high-order bit connected to the reset output.

26. An electronic circuit according to claim 25, wherein said reset counter comprises a register.

27. An electronic circuit according to claim 26, further comprising an activation input, and a logic circuit having a first input connected to the activation input and a second input connected to the reset output of said reset counter.

28. An electronic circuit according to claim 27, wherein said register comprises a register activation bit connected to the activation input.

29. An electronic circuit according to claim 22, further comprising:

a timer input; and a frequency divider having an input connected to the timer input, and an output connected to said reset counter for decrementing said reset counter when a signal is applied thereto by said frequency divider.

30. An electronic circuit according to claim 29, wherein duration of the refresh countdown is less than a time period separating two decrements of said reset counter.

31. An electronic circuit according to claim 29, wherein said refresh counter is connected to the timer input for receiving a clock signal, said refresh counter comprising a plurality of bits and being decremented when the clock signal is applied thereto.

32. An electronic circuit according to claim 22, wherein duration of the reset countdown is programmable.

* * * * *